UNITED STATES PATENT OFFICE.

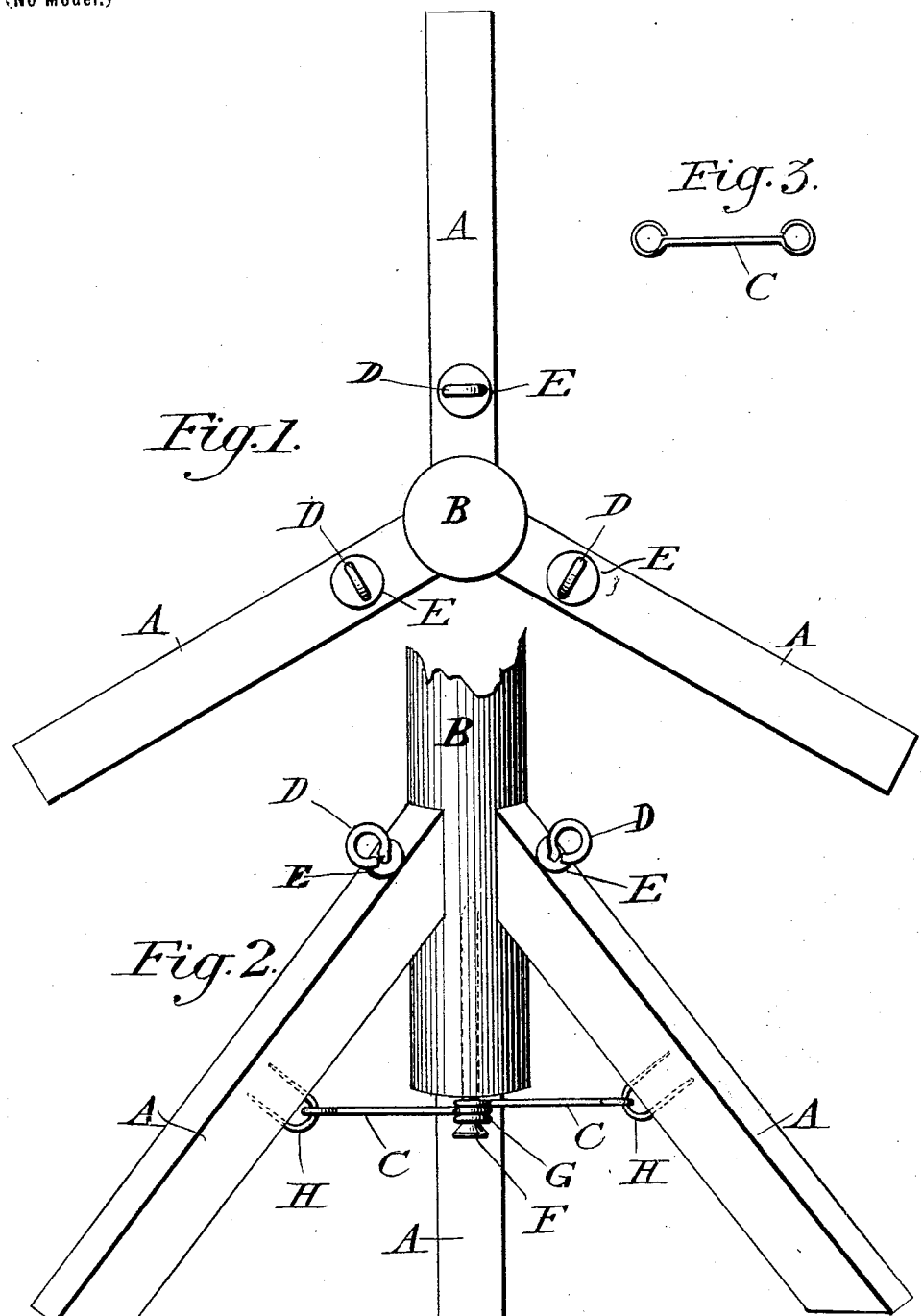

WILLIAM COOK, OF NEW YORK, N. Y.

CHRISTMAS-TREE STAND.

SPECIFICATION forming part of Letters Patent No. 710,762, dated October 7, 1902.

Application filed July 29, 1901. Serial No. 70,178. (No model.)

*To all whom it may concern:*

Be it known that I, WILLIAM COOK, a citizen of the United States, residing at New York, in the county and State of New York, have invented a new and Improved Christmas-Tree Stand, of which the following is a full, clear, and exact description.

The object of my invention is to provide a Christmas-tree stand that while being stronger and neater in appearance is more economical of construction and more easily applied than those usually made for that purpose. I attain this object by the device illustrated in the accompanying drawings, in which—

Figure 1 is a plan view, Fig. 2 a side elevation, and Fig. 3 one of the links C.

Fig. 2 shows the legs A shaped to stand at an angle from axis of tree and also shows how links C are secured to legs A by staples H.

In attaching this stand to tree a wire nail is threaded through the unoccupied eyes of the several links C and driven upward in bottom end of tree. The upper ends of legs A are then brought close to body of tree and secured thereto by means of screw-eyes D. It will thus be seen that size of tree offers no obstacle to its being quickly attached.

In operation this stand holds the tree very secure. The tendency of legs A to spread by weight of tree causes an outward tension at wire nail F through the several links C and inward pressure on stem of tree by upper part of legs A. Thus the tree is held very secure and perfectly upright by two opposite forces acting a short space apart and derived from weight of tree.

What I claim as my invention, and desire to secure by Letters Patent, is—

1. A Christmas-tree stand composed of legs, and links, one end of each link being connected with one leg at a point intermediate between the ends of the leg, and the opposite ends of the links being connected with each other to form a seat extending transversely between the legs and to which the lower extremity of the tree may be secured, the links being adapted to fold with their point of connection as a center.

2. A Christmas-tree stand having a horizontal seat for a tree and a series of legs, the seat being composed of links formed with eyes at a central meeting-point, the said eyes being united to each other, and the opposite ends of the links being connected to the respective legs at points intermediate between the ends of the legs.

3. A Christmas-tree stand, comprised of legs, secured at an angle to stem of tree and held from spreading by links passing beneath the bottom of the tree, and being connected together at a central point to fold, substantially as described.

WILLIAM COOK.

Witnesses:
 WILLIAM CURTIS,
 ARCHIBALD H. GREGLIS.